United States Patent
Sundberg

[15] 3,685,675
[45] Aug. 22, 1972

[54] SELF-LOADING POWER DRIVEN TRANSPORTING VEHICLES

[72] Inventor: Nils O. Sundberg, 7 Tunnbindargrand, 702 23 Orebro, Sweden

[22] Filed: June 8, 1970

[21] Appl. No.: 44,356

[52] U.S. Cl. ..................214/501, 214/78, 214/765
[51] Int. Cl. ...............................................B60p 1/04
[58] Field of Search........214/501, 90, 91, 77, 78, 79, 214/80, 765

[56] References Cited

UNITED STATES PATENTS

| | | | |
|---|---|---|---|
| 3,356,240 | 12/1967 | Zink | 214/501 |
| 2,537,010 | 1/1951 | Andersen | 214/765 |
| 631,096 | 8/1899 | Smith | 214/765 X |
| 2,296,085 | 9/1942 | Boldt | 214/501 |

Primary Examiner—Albert J. Makay
Attorney—Munson & Fiddler

[57] ABSTRACT

A transporting vehicle suitable for underground use has a forwardly tiltable container and a power shovel for loading the container. The shovel is pivotably mounted on two arms and two links, all of which are pivotably mounted on the container. The arms and the links cross each other when the shovel is in a digging position, but they are substantially parallel when the shovel is in a raised discharge position. The arms can be locked in the discharge position relative to the container so that the power jacks for swinging the arms and thereby the shovel can be used also for tilting the container forwardly into dumping position.

8 Claims, 11 Drawing Figures

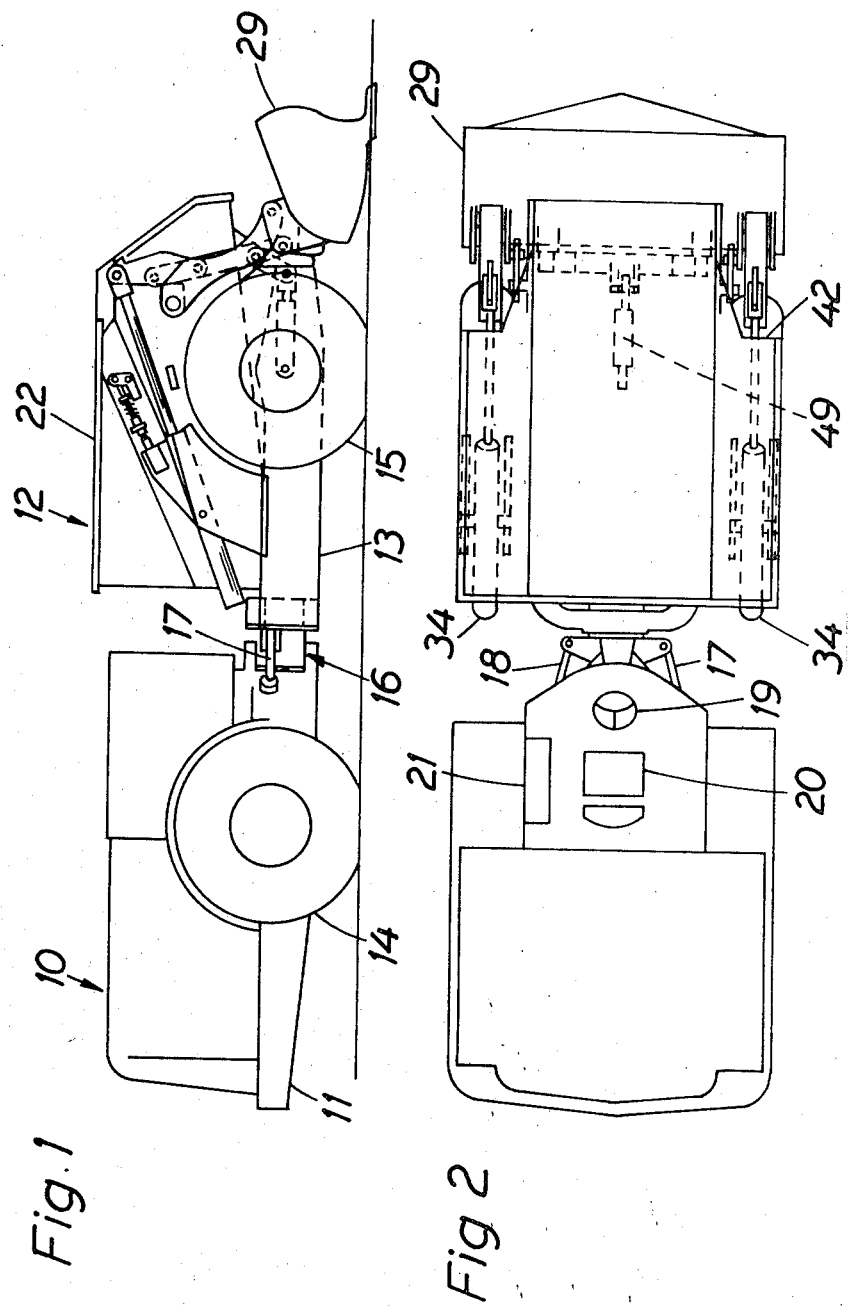

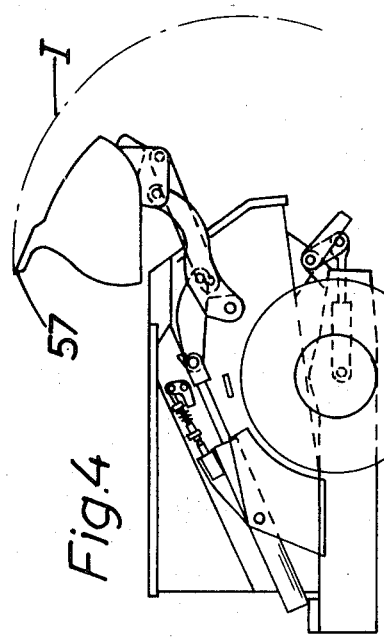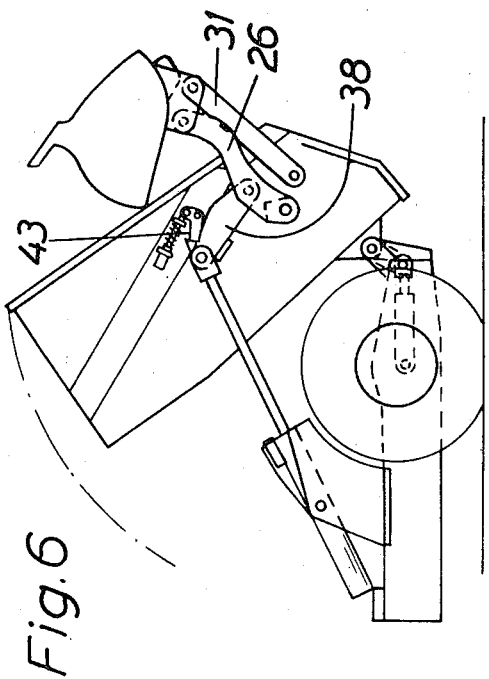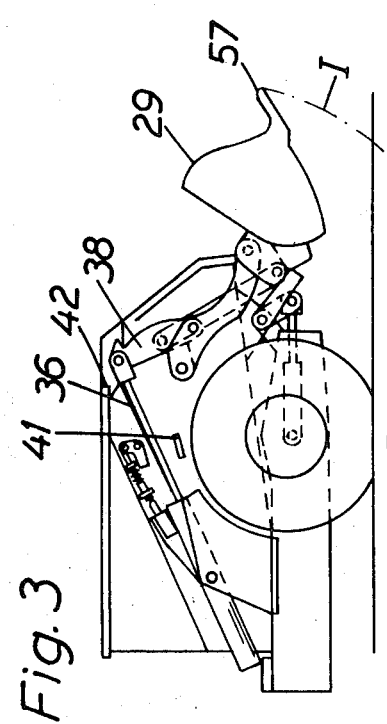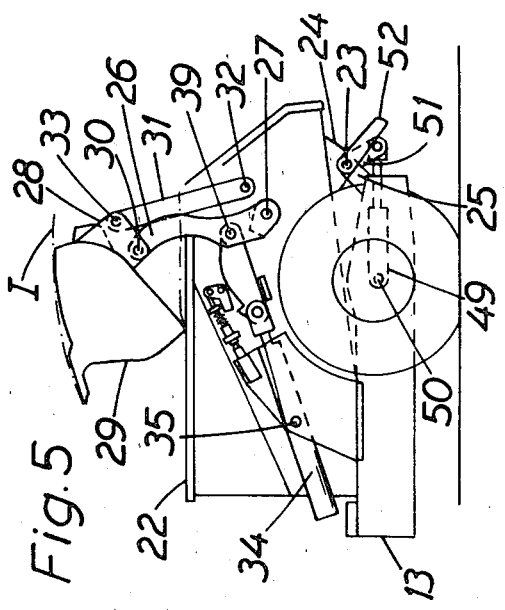

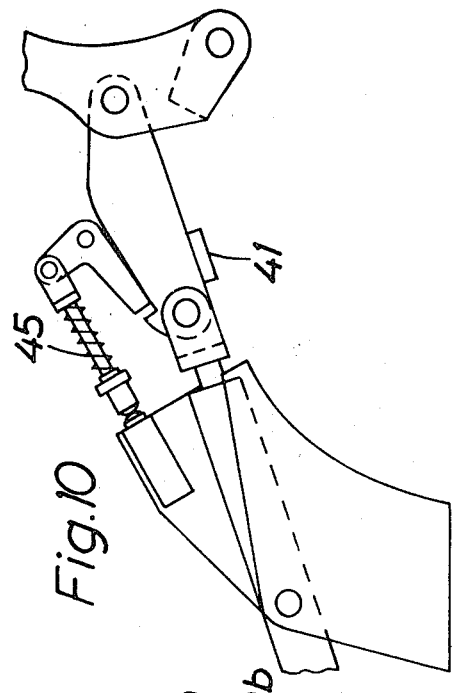
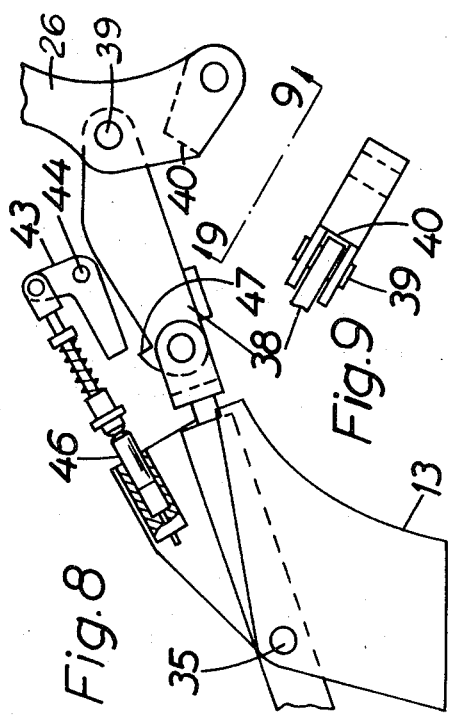
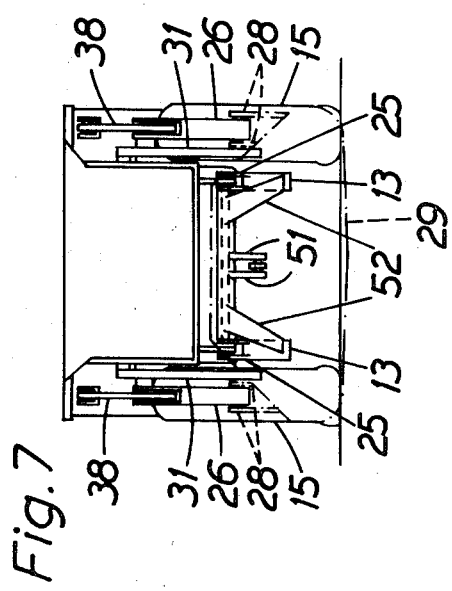
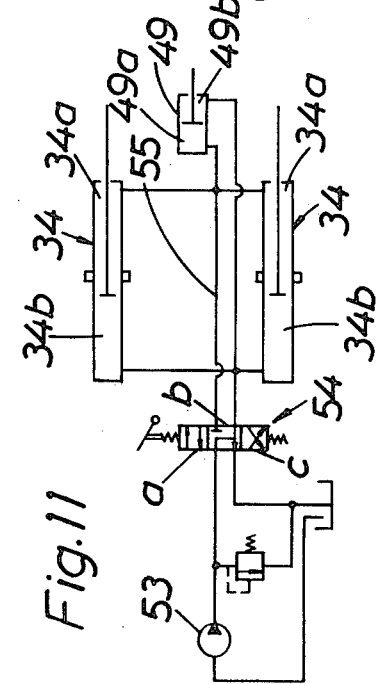
NILS OLOF SUNDBERG
*INVENTOR.*
BY    MUNSON & FIDDLER,
Attorneys.

SELF-LOADING POWER DRIVEN TRANSPORTING VEHICLES

This invention relates to self-loading power driven transporting vehicles of the type which has a motor driven wheeled chassis with a container and which has also a power shovel for loading the container.

It is an object of the invention to provide a vehicle of this type which has an improved mounting of the shovel. Another object is to provide a vehicle of this type which has improved shovel swinging means. Still another object is to provide a vehicle of this type which has common power means for swinging the shovel and for tilting the container forwardly into a dumping position.

A self-loading transporting vehicle according to the invention is illustrated by way of example in the accompanying drawings in which:

FIG. 1 is a side view of the vehicle which comprises a motor unit and a container unit, FIG. 2 is a top view of the vehicle, FIGS. 3 – 5 are side views of the container unit, the shovel being in various positions, FIG. 6 is a side view of the container unit, the container being in the dumping position, FIG. 7 is a front view of the vehicle, the shovel being illustrated by a broken line, FIG. 8 is an enlarged fragmentary view of some details illustrated in FIGS. 1 – 7, FIG. 9 is a fragmentary view as indicated by line 9 — 9 in FIG. 8, FIG. 10 is a view as FIG. 8, but showing another position of some of the details, and FIG. 11 is a fragmentary circuit diagram.

The vehicle illustrated on the drawings comprises a motor unit 10, which has a chassis frame portion 11, and a container unit 12 which has a chassis frame portion 13. The chassis frame portions 11, 13 are carried by pairs of wheels 14; 15 with build-in hydraulic motors and connected together by means of a hinge connection 16 having a vertical turn axis. Preferably, the connection 16 permits some twisting as well as turning. Steering is accomplished by means of two power jacks 17, 18 which are actuated by means of valves which are controlled by means of a steering wheel 19. The operator's seat 20, the steering wheel 19, and the instrument panel 21 can be turned 180° as a unit to facilitate driving to the left in FIG. 2. This arrangement is described in U.S. Pat. No. 3,357,513. In the description and the claims, the container unit is referred to as the forward portion of the vehicle and the motor unit as the rear portion, and, thus, the forward direction is to the right in the figures.

A container 22 has a pair of lugs 24 by means of which it is pivotably mounted on a transverse bar 23. The bar 23 is fastened to pairs of lugs 25 on the chassis frame portion 13. At each side of the container 22 there is an arm 26 mounted so as to swing on a pivot 27. The outer ends of the arms 26 are pivotably connected to pairs of lugs 28 on a shovel 29 by means of pivots 30. A pair of links 31 are connected between pivots 32 on the container and pivots 33 on the lugs 28 so as to control the turning of the shovel on the pivots 30. A pair of hydraulic jacks 34 are pivotably mounted on the chassis by means of pairs of trunnions 35 and their piston rods 36 are pivotably connected to a pair of links 38 which in turn are pivotably connected to the arms 26 by means of pivots 39. On the arms 26, there are abutments 40, FIGS. 8, 9, which limit the counterclockwise swinging of the links 38 relative to the arms 26, and on the container 22, too, there are a pair of abutments 41 for the links 38.

The shovel 29 is in FIG. 5 in its rearmost position with the arms 26 abutting against the container at 42. In this position, the arms 26 can be arrested as shown in FIGS. 6 and 10 by means of a pair of pawls 43 which are pivotably mounted at 44 on the container 12. The pawls 43 are biased into this locking position by means of springs 45 as soon as small hydraulic jacks 46 are relieved of pressure. One of these jacks 46 is shown in FIG. 8 in the position in which it pushes its associated pawl 43 out of engagement with a shoulder 47 of one of the links 38.

On the transverse bar 23, there is a sleeve 48 journalled which is turnable by means of a hydraulic jack 49. The jack 49 is pivotably connected between the chassis frame portion 13 at 50 and lugs 51 on the sleeve 48. The sleeve 48 has also a pair of supports 52 which are adapted to support the shovel and which, when the shovel is in its lowermost digging position, are supported by the chassis frame portion 13 as illustrated in FIG. 1.

It is obvious from the description above that the shovel mounting and actuation arrangement is symmetrical with respect to a longitudinal medial vertical plane.

The hydraulic circuit for actuating the jacks 34, 34, 49 are illustrated in FIG. 11. The jacks have pressure chambers referred to as 34a, 34b, 49a, 49b. A pump 53, situated on the motor unit 10, supplies hydraulic fluid to a manually operated control valve 54 situated on the instrument panel 21. The control valve 54 has three alternative positions represented by its squares a, b, c. When the control valve 21 is in its illustrated position, i.e. the square b is connected, the jacks 34, 34, 49 are locked. When the control valve 54 has its square a connected, a conduit 55 is pressurized and the jacks 34, 34 contracts but the jack 49 extends. When the control valve 21 has its square c connected, a conduit 56 is pressurized and the jacks 34, 34 extends but the jack 49 contracts.

The digging, loading, and dumping operations will now be described.

Filling of the shovel is obtained by moving the vehicle forwards into the pile of material, such as blasted rock or stone, with the shovel 29 in the digging position illustrated in FIG. 1. When the control valve 54 is now switched from position b into position a, the two jacks 34 contract and the jacks 49 extend. The result is that the jack 49 turns the sleeve 48 about the bar 23 so that the supports 52 push the shovel 29 forwards/upwards at the same time as the jacks 34 swing the arms 26 counterclockwise in the figures by means of the links 38. Because the hydraulic fluid delivered by the pump 53 actuates the three jacks 34, 34, 49, the motion of the shovel is slow, but the digging and breaking power is great. When, however, the jack 49 reaches its extended end position, FIG. 3, i.e. its extension is mechanically stopped, the two jacks 34 receive all the hydraulic fluid delivered by the pump, and, thus, the swinging of the arms continues at an increased angular velocity. The links 38 are in contact with the abutments 41 and act as levers except during the last portion of the swinging when they act as pulling elements without any leverage action.

When the jacks 34 push the arms 26 from the positions shown in FIG. 5, the links 38 are guided by means of the abutments 41 and the pawls 43. If the jacks 46 are relieved of pressure the pawls 43 will instead lock the links 38 to the container 22 as illustrated in FIGS. 6 and 10, and the jacks 34 will tilt the container 22 forwardly into dumping position as illustrated in FIG. 6.

Since the links 31 cross the arms 26 when the shovel 29 is in its lowermost digging position (FIG. 1), the shovel 29 turns counterclockwise relative to the arms 26 during a first portion of the upward swinging of the arms 26 as can be seen from FIGS. 1, 3 and 4.

During the discharge portion of the swinging of the shovel 29, the shovel turns clockwise relative to the arms 26, i.e. its movement is almost parallel. However, a slight tilting of the shovel may be preferable during the discharge of the shovel. The arms 26 and the links 31 are of the same length, but the distance between the pivots 27, 32 is somewhat, e.g. 10 percent, smaller than the distance between the pivots 30, 33. If, instead, the pivots 27, 32, 30, 33 were to form the corners of a perfect parallelogram in FIG. 5, the pivots 27, 32, 30, 33 would be situated in a straight line in FIG. 4, and, in that position, the shovel could start turning in either direction relative to the arms.

The described parallel or almost parallel discharge movement of the shovel provides that the material is evenly spread out over the whole container and not charged in a pile only as would be the case if the shovel 29 were mounted in a fixed position on the arms 26.

In FIGS. 3, 4 and 5, the movement of the leading edge 57 of the shovel 29 is indicated by a dash-and-dot line I. This line I points out the low height needed for swinging the shovel to discharge position, which makes the vehicle very suitable for underground use.

If the shovel 29 cannot be lowered to the position illustrated in FIG. 1 because of a rough floor, the shovel is not supported by the chassis by means of the supports 52. When, however, the entire vehicle is forwarded and the shovel pressed into a pile of material, the shovel swings backwards/downwards a little and the jacks 34 extend. Since the conduit 55 is blocked by the control valve 54 which is in its illustrated position, fluid now flows from the chambers 34a to the chamber 49a. As a result, the jack 49 extends so that the supports 52 are forwarded to support the shovel.

It is to be understood that the described vehicle is only an example of the invention, and that the invention may be varied in many ways within the scope of the claims.

I claim:

1. A self-loading power driven transporting vehicle comprising a motor driven wheeled chassis with a container, a pair of arms pivotably mounted on the vehicle for swinging in vertical planes about a first horizontal axis, a shovel pivotably mounted on said pair of arms so as to be tiltable about a second axis which is parallel with said first axis, a pair of power jacks for swinging the arms and the shovel from a digging position in front of the container to a discharge position over the container, a first pair of links pivotably mounted on the vehicle and pivotably connected to the shovel so as to cross the arms when the shovel is in the digging position but to be substantially parallel with the arms when the shovel is in a raised position, said container being mounted on the forward portion of the chassis so as to be tiltable forwardly, said pair of arms being pivotably mounted on the container and pivotably connected to said shovel, said first pair of links being pivotably mounted on the container and pivotably connected to said shovel, and said pair of power jacks being pivotably mounted on the chassis and connected with said pair of arms, a second pair of links pivotably connected to said pair of arms, said pair of power jacks being pivotably connected to said second pair of links, a pair of abutting means are arranged to hold said second pair of links in fixed positions with respect to the pair of arms during a first portion of the swinging of the shovel from the digging position to the discharge position whereby the second pair of links will act as levers during this first portion of the swinging, the second pair of links acting as pulling links during the remaining portion of the swinging of the shovel from the digging position to the discharge position.

2. A self-loading power driven transporting vehicle comprising a motor driven wheeled chassis with a container, a pair of arms pivotably mounted on the vehicle for swinging in vertical planes about a first horizontal axis, a shovel pivotably mounted on said pair of arms so as to be tiltable about a second axis which is parallel with said first axis, a pair of power jacks for swinging the arms and the shovel from a digging position in front of the container to a discharge position over the container, a first pair of links pivotably mounted on the vehicle and pivotably connected to the shovel so as to cross the arms when the shovel is in the diggiing position but to be substantially parallel with the arms when the shovel is in a raised position, said container being mounted on the forward portion of the chassis so as to be tiltable forwardly, said pair of arms being pivotably mounted on the container and pivotably connected to said shovel, said first pair of links being pivotably mounted on the container and pivotably connected to said shovel, and said pair of power jacks being pivotably mounted on the chassis and connected with said pair of arms, and means for arresting the shovel and the arms in a raised position with respect to said container so as to permit tilting forwardly of the container by means of said pair of power jacks and thereby effect discharge of the container.

3. A self-loading power driven transporting vehicle comprising a motor driven wheeled chassis with a container, a shovel carried by a pair of arms which are pivotably mounted on the vehicle for swinging in vertical planes, a pair of links pivotably connected to said pair of arms, a pair of power jacks pivotably mounted on the vehicle, pivotably connected to the pair of links, and adapted to swing the arms and, thereby, to swing said shovel from a digging position in front of the container to a dischare position over the container when contracting, a pair of abutting means arranged to hold the pair of links in fixed positions with respect to the pair of arms during a first portion of the swinging of the shovel from the digging position to the discharge position so that the links act a levers during this first portion of the swinging, the links acting as pulling links without lever action during the remaining portion of the swinging of the shovel from the digging position to the discharge position, said container being mounted on the forward portion of the chassis so as to be tiltable forwardly, said pair of arms being pivotably mounted on the container, and said pair of power jacks being pivotably mounted on the chassis.

4. A self-loading power driven dump vehicle comprising a motor driven wheeled chassis, a container mounted on the chassis so as to be tiltable forwardly, a shovel carried by a pair of arms which are pivotably mounted on said container for swinging in vertical planes, a pair of power jacks pivotably mounted on the chassis and arranged for swinging said arms and said shovel from a digging position in front of the container to a discharge position over the container, and means for arresting the shovel and the arms in a raised position with respect to said container so as to permit tilting forwardly of the container by means of said pair of power jacks and thereby effect discharge of the container, said means for arresting the shovel and the arms comprising a pair of power actuated pawls.

5. A self-loading power driven transporting vehicle comprising a motor driven wheeled chassis, a container mounted on the forward portion of the chassis so as to be tiltable forwardly, a shovel carried by a pair of arms which are pivotably mounted on the container for swinging in vertical planes, a pair of links pivotably connected to said pair of arms, a pair of power jacks pivotably mounted on the vehicle, pivotably connected to the pair of links, and adapted to swing the arms and, thereby, to swing said shovel from a digging position in front of the container to a discharge position over the container when contracting, a pair of abutting means arranged to hold the pair of links in fixed positions with respect to the pair of arms during a first portion of the swinging of the shovel from the digging position to the discharge position so that the links act as levers during this first portion of the swinging, the links acting as pulling links without lever action during the remaining portion of the swinging of the shovel from the digging position to the discharge position.

6. A vehicle as claimed in claim 5 further comprising second power jack means mounted on the chassis and arranged to assist in swinging the shovel during an initial stage of the swinging of the shovel from the digging position to the discharge position, said pair of power jacks and said second power jack means being hydraulic fluid actuated and connected, hydraulically, in parallel.

7. A vehicle as claimed in claim 5 further comprising means for arresting the shovel and the arms in a raised position with respect to said container so as to permit tilting forwardly of the container by means of said pair of power jacks and thereby effect discharge of the container.

8. A vehicle as claimed in claim 7 in which said means for arresting the shovel and the arms comprises a pair of pawls mounted on the container and actuatable to register with means on said pair of links.

* * * * *